INVENTOR
LEONARD J. BUGAJ
BY
John R. Faulkner
William E. Johnson
ATTORNEYS

United States Patent Office 3,525,848
Patented Aug. 25, 1970

3,525,848
WEAR RESISTANT DEVICE FOR UTILIZATION IN A WELDING OPERATION AND A METHOD OF MAKING THE SAME
Leonard J. Bugaj, Dearborn, Mich., assignor to Ford Motor Company, Dearborn, Mich., a corporation of Delaware
Filed Oct. 23, 1968, Ser. No. 769,785
Int. Cl. B23k 9/24
U.S. Cl. 219—119                               4 Claims

ABSTRACT OF THE DISCLOSURE

A wear resistant device for utilization in a welding operation comprises a metallic member, a layer of nonconductive material on the outer surface of the metallic member, a thin conductive layer on the layer of nonconductive material, and a layer of electrodeposited material on the thin layer of conductive material. The electrodeposited layer is formed of a material which is highly resistant to scratching and marring when engaged by sharp edges of metal articles.

BACKGROUND OF THE INVENTION

Many of the devices suc has welding electrodes and locating pins utilized in a resistance welding apparatus must be insulated during the welding operation so that extraneous grounding circuits are not completed through them. In prior practice thick nylon coatings, friction tape, insulating washers and bushings and other insulating materials were utilized in association with exposed surfaces of the welding electrodes and locating pins to prevent the completion of the extraneous circuits therethrough during the welding operation. All of these prior materials produced a rather bulky and/or an expensive form of insulation. Also, the prior materials either were rapidly worn out when engaged by the sharp edges of the metal blanks which were welded in the welding apparatus or, in the case of insulating washers and bushings, rendered ineffective by an accumulation of welding flash providing a short circuit path.

SUMMARY OF THE INVENTION

This invenion relates to wear resistant devices such as welding electrodes, adapters, guns and locating pins utilized in a welding apparatus and, more particularly, to a wear resistant device in which a relatively thin, layered structure provides the wear resistant, protective medium for the device. This invention also relates to a method of making such a wear resistant device.

A wear resistant device such as an electrode or locating pin for utilization in a welding apparatus is formed in accordance with the teachings of this invention from a metallic core member. A layer of nonconductive material is placed on the surface of the metallic core member to be protected to provide insulation for the member. A thin layer of conductive material is placed on the layer of nonconductive material. Thereafter, a layer of electrodeposited material is placed on the thin layer of conductive material. The electrodeposited layer is formed of a material highly resistant to scratching and marring when engaged by sharp edges of metal blanks.

In greater detail, the metallic core member is a copper welding electrode and the nonconductive material one the surface of the electrode has a thickness of from 0.003 to 0.045 inch and an infinite resistance at a potential of 500 volts D.C. The layer of electrodeposited material is selected from the group of metals consisting of nickel and chrome and the layer has a thickness of at least 0.010 inch.

In accordance with the method of this invention, the device utilized in a welding apparatus is formed by applying the layer of nonconductive material to the outside surface of the core member as by dipping the core into a molten bath of the material. Thereafter, a thin coating of a conductive material is applied to the outside surface of the nonconductive material by painting conductive paint on the nonconductive material. Finally, the outside, protective material is electroplated on the surface of the thin conductive material with the thin conductive material serving as an electrode during the electroplating operation.

DESCRIPTION OF THE PREFERRED EMBODIMENT

In the resistance welding of metal blanks such as the welding of the body members necessary to construct an automobile, the welding electrode sometimes has to be inserted through an opening in one of the blanks prior to the performance of the welding operation. The electrode is generally engaged by the sharp edges of the blank into which it is inserted. The electrode must be electrically insulated so that if it contacts a sharp edge of one of the blanks to be welded during the welding operation, no short circuit condition will exist. Similarly, locating pins upon which the metal blanks are seated in the welding apparatus also must be insulated so that no short circuit conditions exist through them during the welding operation.

The prior art has taught that devices such as locating pins and welding electrodes may be electrically insulated in one manner by applying a hot dipped nylon coating or, in another manner, by wrapping friction tape therearound. Also, in the case of locating pins, insulating washers and bushings have been utilized for mounting the pins in the welding appartus. Other similar schemes have also been proposed but in all of these schemes the resulting insulation for the device is rather thick and/or of poor wear resistant quality. Generally the sharp edges of the blanks to be welded wear through the ⅛ to ¼ inch coating of tape or other nonconductive material in a short number of cycles of operation of the device thereby causing short circiuts in the welding apparatus requiring reinsulation of the defective portion thereof.

Figure 1:
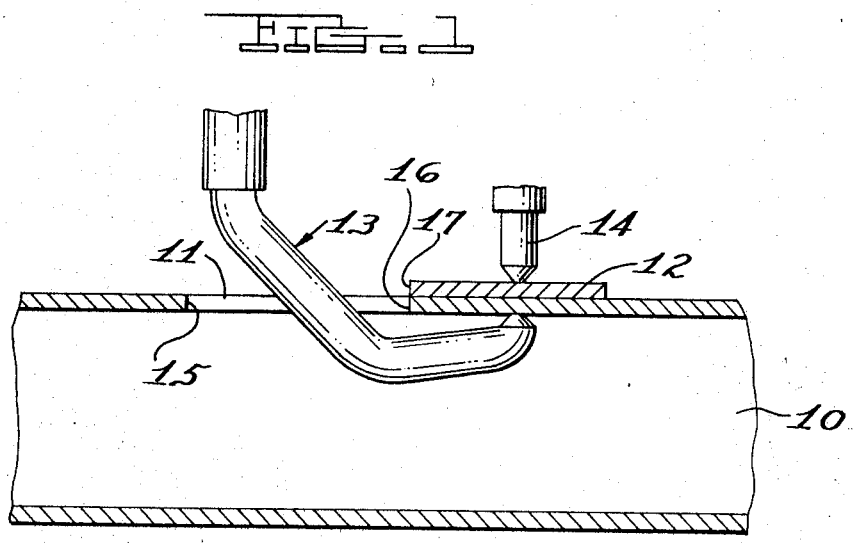
FIG. 1 is a schematic view of a welding electrode formed in accordance with the teachings of this invention.

The device of this invention will be understood best by reference to FIG. 1. In FIG. 1 there is shown a first channel blank or member 10 having an aperture 11 therein. In order to resistance weld a second blank or member 12 to the first blank, it is necessary to insert a resistance welding electrode 13 through the aperture 11 to engage a portion of the first blank. A second welding electrode 14 is positioned on the second blank and clamping pressure is applied to the two electrodes. The resistance welding operation is then carried out to bond the two members together. In a preferred operation of the resistance welding apparatus, electrode 13 is formed of copper metal and is water cooled. The welding electrode generally carries a current load from 8,000 up to 25,000 amps at up to 30 volts, and the electrode operates in a temperature range from 70° to 150° F.

When the welding electrode 13 is inserted in the aperture 11 of the first blank 10, sharp edges 15, 16 and 17 of the blanks 10 and 12 contact surfaces of the welding electrode. This contacting of the electrode by the sharp edges of the blanks can cause a shorting of the electrode during the welding operation through the blanks unless the electrode is protected by insulating material.

Figure 2:
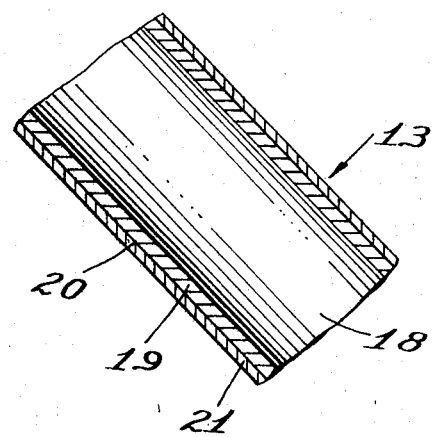
FIG. 2 is a schematic view showing the structural details of the welding electrode of FIG. 1.

In accordance with the teachings of this invention, the welding electrode 13 is protected by insulating material in the following manner. With particular reference to FIG. 2 of the drawings, the welding electrode is formed with an inner copper core 18. In accordance with the specific teachings of this invention, a nonconductive material layer 19 of a thickness from 0.003 to 0.045 inch is placed completely around the outer surface of the copper core. This layer is of such a thickness that the layer has an infinite resistance at a potential of 500 volts D.C.

The intermediate, nonconductive layer 19 may be formed on the copper core 18 by any one of several procedures. In a first procedure, a nylon material may be brushed onto the surface of the copper core 18 and thereafter baked to cure the same. In an alternate procedure an industrial adhesive such as Industrial Adhesive A1150B may be applied to the copper core by dipping and thereafter cured to form a hard, nonconductive layer. In another procedure a polyvinyl chloride plastic can be brushed on to the copper core 18 and thereafter cured.

After the intermediate, nonconductive layer 19 is placed about the core 18, the outer surface of this layer is coated with an electrically conductive material 20. For example, the outer surface of the layer may be sprayed with an electrically conductive paint. For example, a silver containing lacquer such as that known by the name Ecco Coat CC2 produced by Emerson and Cummings, Inc., Canton, Mass., may be applied in a thin coat to the outer surface of the nonconductive material.

An alternate manner of achieving the thin conductive coat or layer 20 could be in an operation where the nonconductive layer 19 is initially etched in a

$$CrO_3-H_2SO_4-H_3PO_4$$

bath and then treated with a solution containing palladium chloride. The palladium chloride is thereby occluded on the nonconductive coating. In a subsequent electroless nickel plating operation, nickel is then deposited with the palladium chloride acting as the catalyst of reaction. The nickel then forms a thin coating or layer of conductive material about the nonconductive coating 19.

Once a conductive layer 20 is formed on the nonconductive layer 19, this layer 20 may serve as an electrode for an electroplating operation. In an electroplating operation a nickel strike is initially placed on the layer 20 and subsequently a full nickel layer 21 is plated onto the electrode to a thickness of from 0.010 to 0.060 inch. The nickel plate 21 thereafter provides a hard, scratch resistant surface layer which is not abraded by the action of the sharp edges 15, 16 and 17 thereon. The insulation layer 19 provides a breakdown resistance for the electrode 13 of at least 500 volts so there is no shorting out of the electrode through the blanks 10 or 12 during a welding operation. Similar protection may likewise be accorded for insulating locating pins or other such surfaces in the resistance welding fixture.

The nickel plating operation may take place from a conventional electroplating bath with a composition such as 40 oz. per gallon nickel sulphate, 8 oz. per gallon nickel chloride and 5½ oz. per gallon boric acid. The plating operation is carried on with a pH of 3½ to 4, and a voltage of 6 volts, with a current density of 50 amps per square foot and a bath temperature of 140° F.

As a substitute for or a supplement to the nickel plate operation, a hard chrome plate may be placed on the electrode layer to provide the wear resistant surface layer 21. In such a case, the chrome plating bath would have a basic composition of about 40 oz. per gallon chromic acid and 0.4 oz. per gallon of sulfuric acid and would operate at current density of 150 amps per square foot and at a bath temperature of 130° F.

The wear resistant electrode of this invention has a prolonged life because the hard, metallic coating overlying the insulation layer protects the electrode from the sharp edges of the metal blanks. Thus, the electrode and locating pins treated in accordance with the teachings of this invention are desirable for use in resistance welding apparatus.

What is claimed is:
1. A wear resistant, resistance welding electrode which comprises: a metal welding electrode; a layer of nonconductive material on the outer surface of said welding electrode; a thin conductive layer on said layer of nonconductive material; and a layer of electrodeposited material on said layer of conductive material, said electrodeposited layer being formed of a material highly resistant to scratching and marring when engaged by sharp edges of metal articles.

2. A wear resistant, resistance welding electrode which comprises: a copper welding electrode; a layer of nonconductive material on the outer surface of said electrode; a thin layer of conductive paint on said layer of nonconductive material; and a layer of electrodeposited material selected from the group consisting of nickel and chrome over said conductive paint layer.

3. The wear resistant, resistance welding electrode of claim 2 wherein said nonconductive layer has both a thickness of from 0.010 to 0.060 inch and an infinite resistance at a potential of 500 volts D.C.

4. The resistance welding electrode of claim 2 wherein the layer of electrodeposited material has a thickness of at least 0.010 inch.

References Cited

UNITED STATES PATENTS

| 1,982,098 | 11/1934 | Hartmann | 219—119 |
| 2,023,364 | 12/1935 | Crapo | 219—146 |
| 2,552,176 | 5/1951 | Hummitzsch | 219—146 |
| 3,102,827 | 9/1963 | Kriewall et al. | 117—204 |

JOSEPH V. TRUHE, Primary Examiner

L. A. ROUSE, Assistant Examiner